(12) United States Patent
Ohzaki (10) Patent No.: US 12,250,210 B2
(45) Date of Patent: Mar. 11, 2025

(54) INFORMATION PROCESSING APPARATUS, METHOD, AND MEDIUM FOR LOGIN WITH DUPLICATE IDENTIFIERS

(71) Applicant: Hiroki Ohzaki, Kanagawa (JP)

(72) Inventor: Hiroki Ohzaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 212 days.

(21) Appl. No.: 17/929,811

(22) Filed: Sep. 6, 2022

(65) Prior Publication Data

US 2023/0078651 A1 Mar. 16, 2023

(30) Foreign Application Priority Data

Sep. 13, 2021 (JP) ................. 2021-148864

(51) Int. Cl.
H04L 9/40 (2022.01)
(52) U.S. Cl.
CPC .......... H04L 63/083 (2013.01); H04L 63/102 (2013.01)
(58) Field of Classification Search
None
See application file for complete search history.

(56) References Cited

U.S. PATENT DOCUMENTS

| 10,685,131 B1* | 6/2020 | Lunsford | G06F 21/316 |
| 10,880,290 B2* | 12/2020 | Berkovitz | G06F 21/43 |
| 2005/0005249 A1* | 1/2005 | Hill | G06F 3/0481 715/810 |
| 2016/0125173 A1 | 5/2016 | Ohzaki et al. | |
| 2016/0125177 A1 | 5/2016 | Kashiyama et al. | |
| 2016/0127349 A1 | 5/2016 | Nakajima et al. | |
| 2016/0127356 A1 | 5/2016 | Fukuda et al. | |
| 2017/0054684 A1 | 2/2017 | Ohzaki et al. | |
| 2017/0063871 A1 | 3/2017 | Kashiyama et al. | |
| 2017/0149788 A1 | 5/2017 | Ohzaki et al. | |
| 2018/0255048 A1* | 9/2018 | Berkovitz | H04L 63/0815 |
| 2018/0268124 A1 | 9/2018 | Ohzaki et al. | |
| 2018/0270246 A1 | 9/2018 | Fukuda et al. | |
| 2019/0114403 A1* | 4/2019 | Zhang | G06F 21/121 |

FOREIGN PATENT DOCUMENTS

CN 112487402 3/2021
JP 2016-091211 5/2016

OTHER PUBLICATIONS

Extended European Search Report for 22194297.2 mailed on Feb. 3, 2023.

* cited by examiner

Primary Examiner — William J. Goodchild
(74) Attorney, Agent, or Firm — IPUSA, PLLC (57) ABSTRACT

An information processing apparatus includes circuitry and a memory storing computer-executable instructions. Upon receiving a login request with identification information, the apparatus searches a storage for corresponding user information. When multiple pieces of user information are retrieved, the apparatus selects one piece of user information among multiple pieces retrieved by the search, as the user information for which login is to be allowed. The user information includes the identification information and a date and time when the identification information was stored in the storage, and the selecting is based on the date and time.

10 Claims, 11 Drawing Sheets

LOGIN

E-MAIL ADDRESS yamada@abc.com

PASSWORD

| TENANT ID | USER ID | E-MAIL ADDRESS | PASSWORD | CREATED DATE AND TIME | LOGIN DATE AND TIME |
|---|---|---|---|---|---|
| 111111111 | yamada | yamada@abc.com | AAAAAA1234 | 2020/10/15 08:00 | 2020/10/16 14:30 |
| 111111111 | suzuki | suzuki@abc.com | BBBBBBBB9876 | 2020/10/15 08:01 | 2020/10/15 08:05 |
| 222222222 | hanako | saitoh@xyz.com | CCCCCCC12 | 2020/10/16 10:00 | 2020/10/16 13:50 |
| 222222222 | taroh | yamada@abc.com | AAAAAA1234 | 2020/10/16 10:01 | 2020/10/18 16:40 |
| 333333333 | taroh.yamada | yamada@abc.com | XXXX+-12 | 2020/10/17 13:30 | 2020/10/17 13:35 |
| 444444444 | tyamada | yamada@abc.com | XXXXX+-12345 | 2020/10/18 14:40 | 2020/10/19 14:50 |

| TENANT ID | USER ID | |
|---|---|---|
| 111111111 | yamada | SELECT |
| 222222222 | taroh | SELECT |

| TENANT ID | PASSWORD LENGTH | NECESSITY OF NUMERICAL VALUE | NECESSITY OF SYMBOL |
|---|---|---|---|
| 111111111 | 8 CHARACTERS OR MORE | NECESSARY | UNNECESSARY |
| 222222222 | 8 CHARACTERS OR MORE | NECESSARY | UNNECESSARY |
| 333333333 | 10 CHARACTERS OR MORE | NECESSARY | UNNECESSARY |
| 444444444 | 10 CHARACTERS OR MORE | NECESSARY | NECESSARY |

INFORMATION PROCESSING APPARATUS, METHOD, AND MEDIUM FOR LOGIN WITH DUPLICATE IDENTIFIERS

CROSS-REFERENCE TO RELATED APPLICATION

The present application is based on and claims priority under 35 U.S.C. § 119 to Japanese Patent Application No. 2021-148864, filed on Sep. 13, 2021, the contents of which are incorporated herein by reference in their entirety.

BACKGROUND OF THE INVENTION

1. Field of the Invention

The present invention relates to an information processing apparatus, an information processing method, and a recording medium.

2. Description of the Related Art

Conventionally, there is a system in which an e-mail address of a user can be used as a user name for logging in. For example, Patent Document 1 discloses a configuration in which, in order to identify a user by using an e-mail address to allow the user to log in, it is determined whether a contact e-mail address can uniquely identify the user, and in a case where the contact e-mail address can uniquely identify the user, the user can log in by using the e-mail address.

On the other hand, there is a system in which user information is registered for each combination of a user name and a tenant (a contractor of a service such as a department) to which the user belongs.

Patent Document 1: Japanese Patent No. 6476760

SUMMARY OF THE INVENTION

According to one aspect of the present invention, there is provided an information processing apparatus including circuitry; and a memory storing computer-executable instructions that cause the circuitry to execute searching for user information corresponding to identification information included in a login request, in a storage configured to store user information of each user, in response to receiving the login request including the identification information and a password; and selecting, as user information relating to a user for which login is to be allowed, one piece of user information among a plurality of pieces of user information, in response to detecting that the plurality of pieces of user information are retrieved by the searching.

DESCRIPTION OF THE EMBODIMENTS

In a system in which identification information such as an e-mail address can be used as a user name for logging in, duplicate registration of an e-mail address is not allowed. This is because the e-mail address is unique for each user.

On the other hand, in a case where user information is distinguished for each combination of a user name and a tenant, there is a case where it is desired to assign the same person to a plurality of tenants. In such a case, when an e-mail address is used as a user name, in the conventional technology, it is difficult to assign the same person to a plurality of tenants, because it is not possible to register a plurality of pieces of user information having overlapping e-mail addresses.

A problem to be addressed by an embodiment of the present invention is to allow duplication of identification information used for login.

First Embodiment

Figure 1:
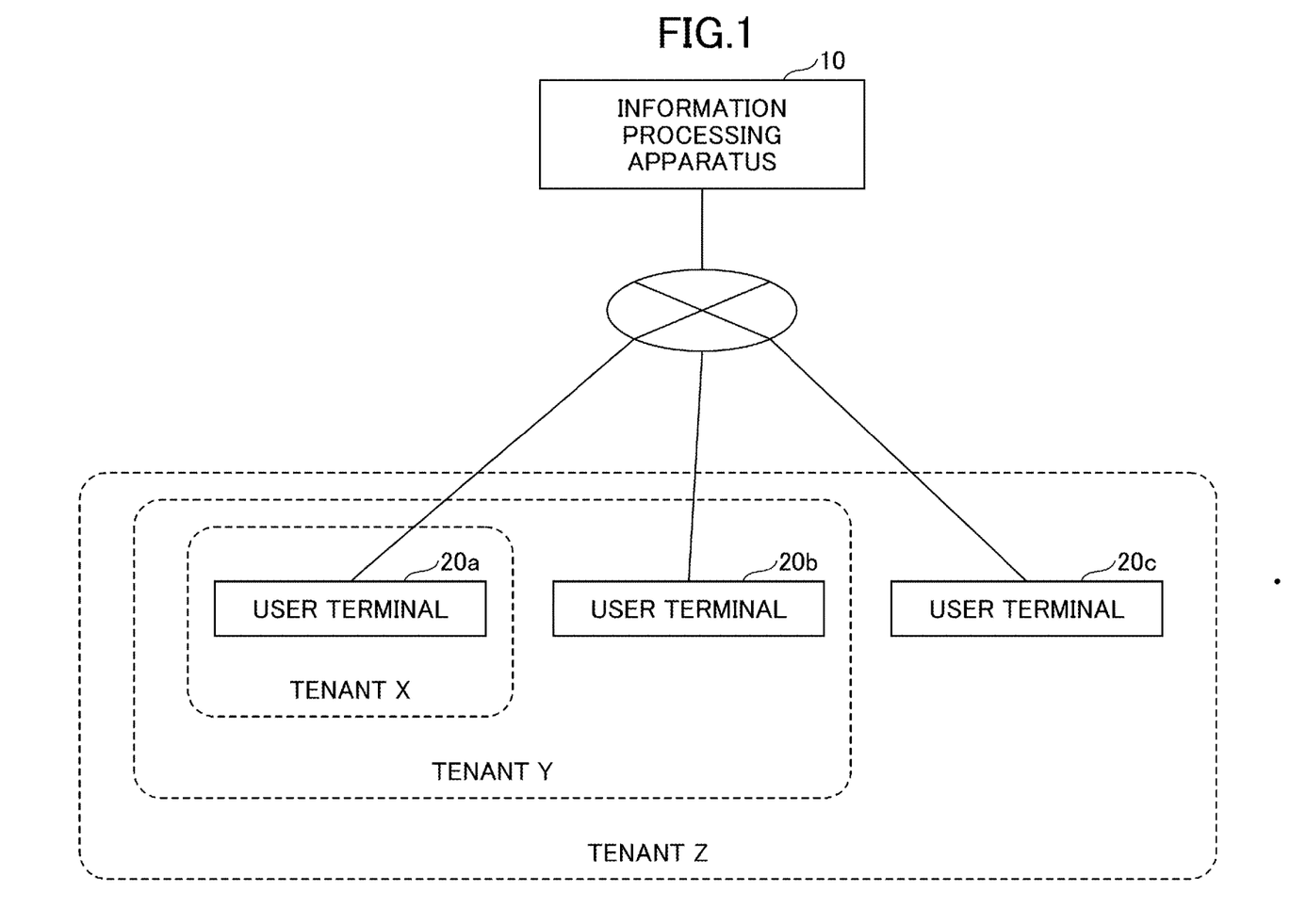
FIG. 1 is a diagram illustrating an example of a system configuration according to a first embodiment of the present invention.

Hereinafter, embodiments of the present invention will be described with reference to the drawings. FIG. 1 is a diagram illustrating an example of a system configuration according to a first embodiment. In FIG. 1, an information processing apparatus 10 is connected, via a network such as the Internet, to user terminals 20a, 20b, 20c, and the like (hereinafter simply referred to as the "user terminal 20" when these are not distinguished from each other). Each user terminal 20 is used by a user belonging to one of the tenants (tenant X, tenant Y, tenant Z, or the like in FIG. 1). A tenant refers to a person who has made a usage contract to use a service provided by the information processing apparatus 10, and is, for example, a corporation, an individual, or a group of a plurality of persons such as a public organization.

For example, the information processing apparatus 10 is one or more computers that provide a service that can be used via a network, such as a cloud service (hereinafter simply referred to as a "service").

The user terminal 20 is a terminal such as a personal computer (PC), a tablet terminal, a smartphone, or the like, used by a user of the service. In order to use a service, the user needs to log in to the information processing apparatus 10.

In FIG. 1, with respect to each user who uses each user terminal 20, the tenant to which the user belongs is indicated by an inclusion relation between a dashed line frame indicating a tenant and the user terminal 20. That is, it is indicated that the user of the user terminal 20a belongs to tenants X, Y, and Z. It is indicated that the user of the user terminal 20b belongs to tenants X and Y. It is indicated that the user of the user terminal 20c belongs to the tenant Z. As described above, in the present embodiment, a certain user can belong to a plurality of tenants (a plurality of tenants can be assigned to a certain user). As examples of cases where one user belongs to a plurality of tenants, cases (1) to (3) are indicated below.

(1) A user who belongs to a tenant of a level of a branch office (business place) or a department (for example, tenant X or Y), needs to also belong to a tenant of a level of the entire company (for example, tenant Z).

(2) A user belonging to a tenant of a company (for example, tenant Y or Z) wants to use the information processing apparatus 10 even in his or her personal life (for example, tenant X). In contrast, a user who uses the information processing apparatus 10 in his or her personal life (for example, tenant X) also uses the information processing apparatus 10 in a company (for example, tenant Y or Z).

(3) A user who belongs to a tenant of the head office (for example, tenant Z) needs to also belong to a tenant of an affiliated company to which the user is temporarily assigned (for example, tenant X).

The relationship between the user terminal 20 and a user does not have to be a one-to-one relationship. That is, the user terminal 20 may be shared by a plurality of users.

Figure 2:
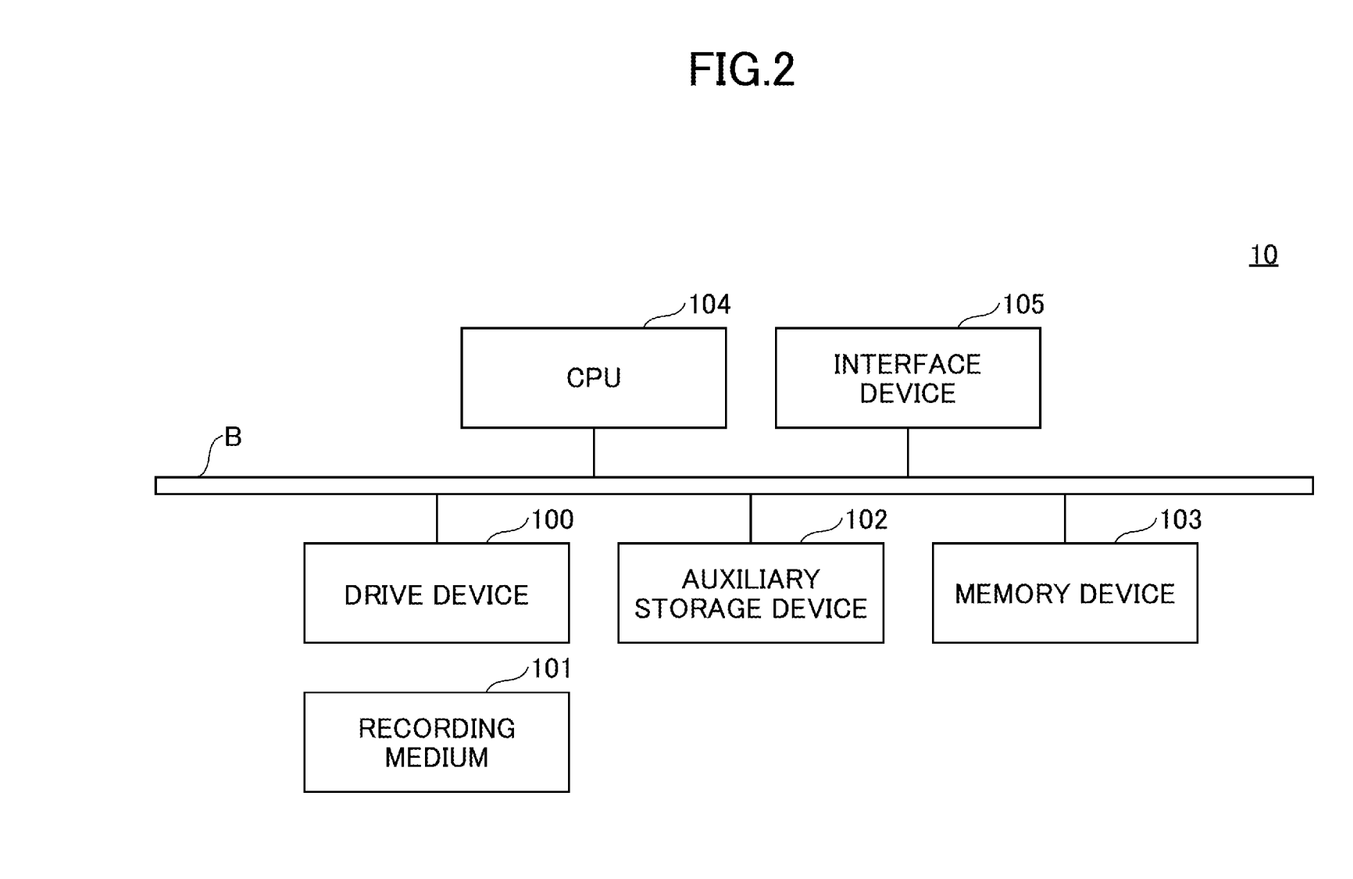
FIG. 2 is a diagram illustrating an example of a hardware configuration of an information processing apparatus according to the first embodiment of the present invention.

FIG. 2 is a diagram illustrating an example of a hardware configuration of the information processing apparatus 10 according to the first embodiment. The information processing apparatus 10 in FIG. 2 includes a drive device 100, an auxiliary storage device 102, a memory device 103, a central processing unit (CPU) 104, an interface device 105, and the like, which are connected to each other via a bus B.

A program for implementing a process in the information processing apparatus 10 is provided by a recording medium 101 such as a compact disc read-only memory (CD-ROM). When the recording medium 101 storing a program is set in the drive device 100, the program is installed in the auxiliary storage device 102 from the recording medium 101 via the drive device 100. However, the program does not necessarily have to be installed from the recording medium 101, and may be downloaded from another computer via a network. The auxiliary storage device 102 stores the installed program and also stores necessary files, data, and the like.

The memory device 103 reads a program from the auxiliary storage device 102 and stores the program in response to an instruction to activate the program. The CPU 104 executes a function related to the information processing apparatus 10 according to a program stored in the memory device 103. The interface device 105 is used as an interface for connecting to a network.

Figure 3:
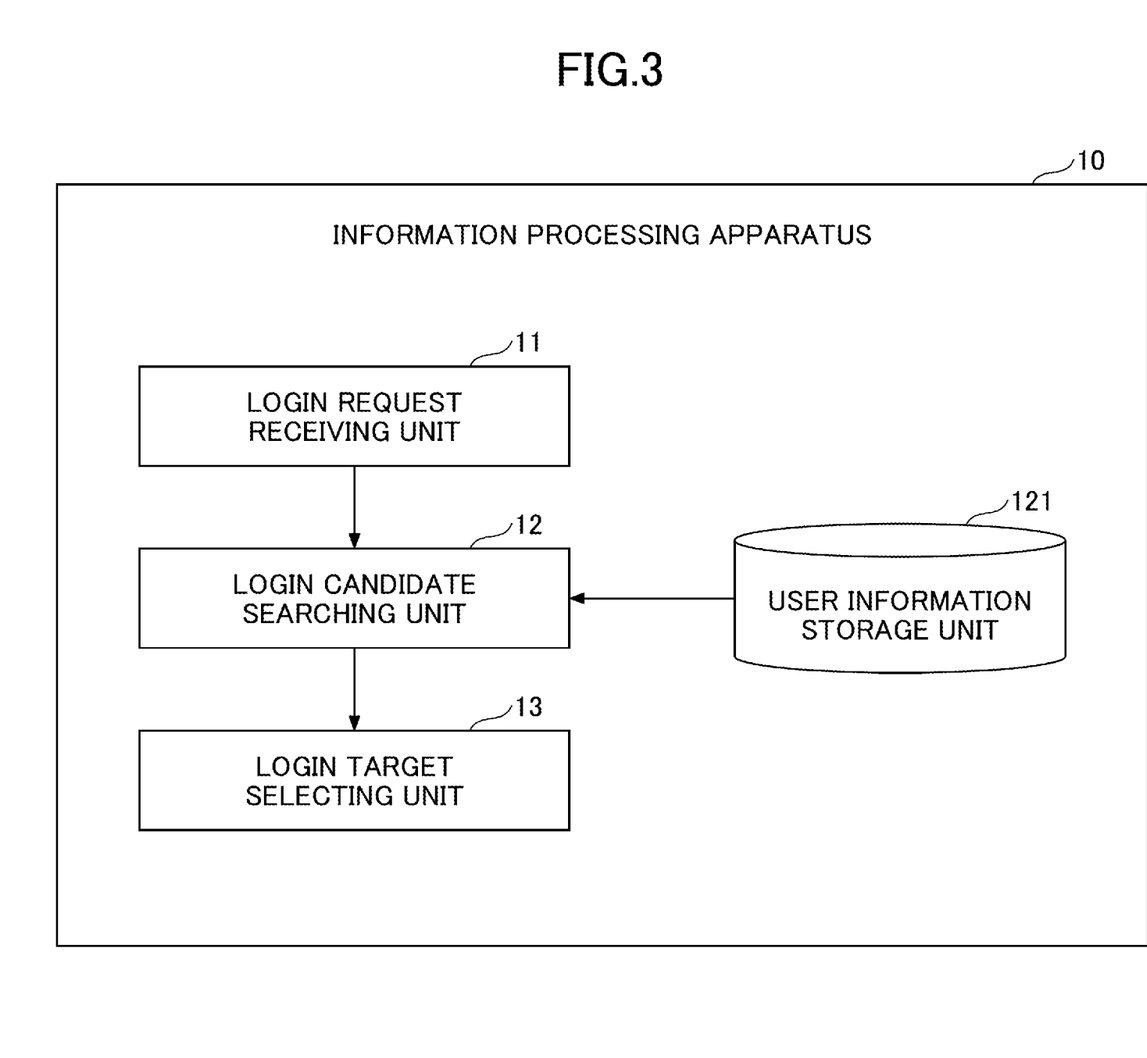
FIG. 3 is a diagram illustrating an example of a functional configuration of the information processing apparatus according to the first embodiment of the present invention.

FIG. 3 is a diagram illustrating an example of a functional configuration of the information processing apparatus 10 according to the first embodiment. In FIG. 3, the information processing apparatus 10 includes a login request receiving unit 11, a login candidate searching unit 12, and a login target selecting unit 13. These units are implemented by a process that one or more programs installed in the information processing apparatus 10 cause the CPU 104 to execute.

The information processing apparatus 10 also uses a user information storage unit 121. The user information storage unit 121 can be implemented by using, for example, the auxiliary storage device 102 or a storage device that can be connected to the information processing apparatus 10 via a network.

The login request receiving unit 11 receives a login request transmitted from the user terminal 20. The login request includes an e-mail address and a password of the user. Here, the e-mail address is an example of identification information used for login. However, the identification information used for login is not limited to an e-mail address, and may be any kind of information that can identify a user, such as a name, a telephone number, or an ID.

The login candidate searching unit 12 searches for a candidate of an entry for which login is allowed based on the login request, from among entries (user information) stored in the user information storage unit 121.

The login target selecting unit 13 selects one entry related to a user for which login is to be allowed, from among the entries retrieved by the search by the login candidate searching unit 12.

Figure 4:
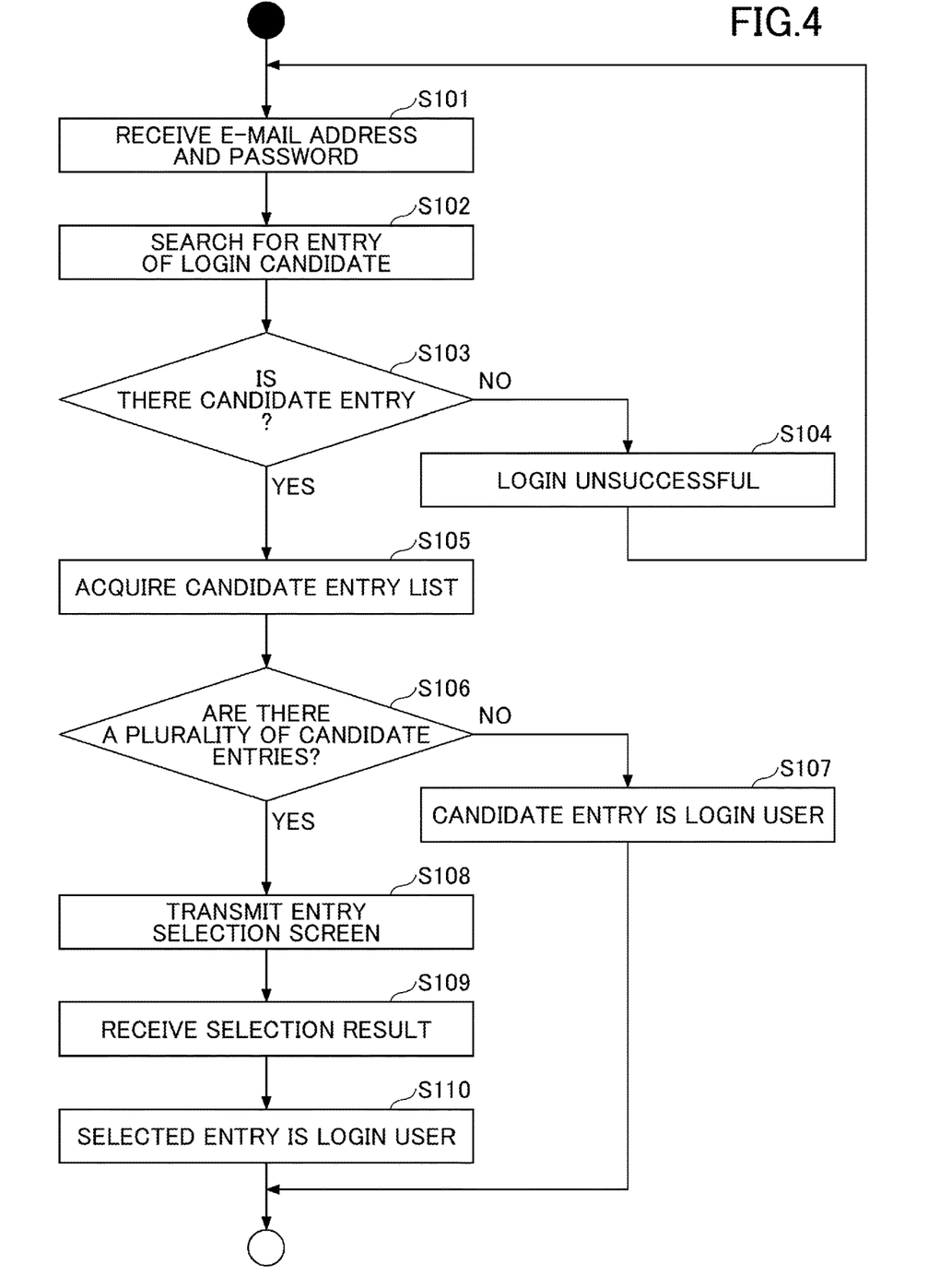
FIG. 4 is a diagram for explaining an example of a processing procedure executed by the information processing apparatus according to the first embodiment of the present invention.

Hereinafter, a processing procedure executed by the information processing apparatus 10 will be described. FIG. 4 is a diagram for explaining an example of a processing procedure executed by the information processing apparatus 10 in the first embodiment.

Figure 5:
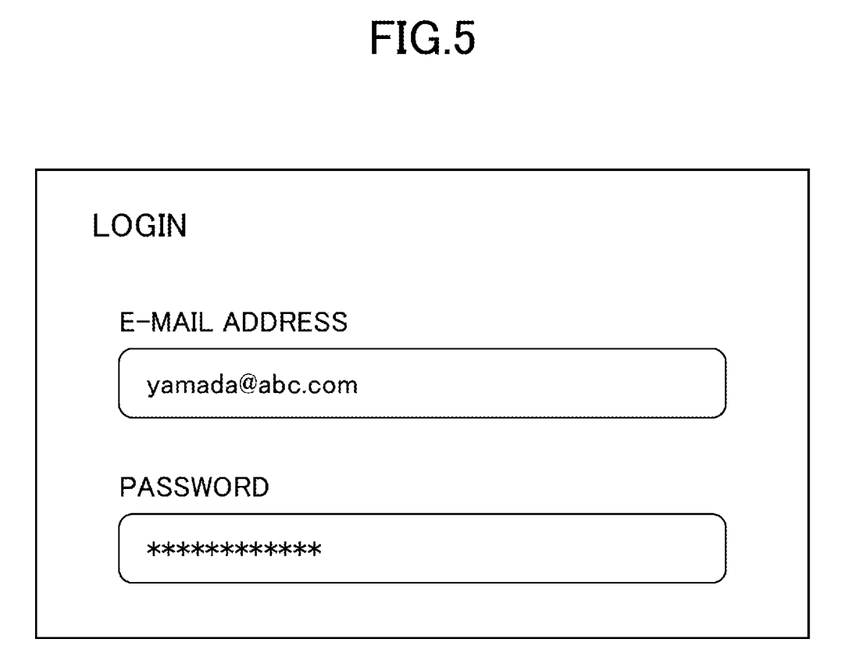
FIG. 5 is a diagram illustrating an example of a login screen according to the first embodiment of the present invention.

When any user attempts to log in to the information processing apparatus 10, the user terminal 20 displays, for example, a login screen as illustrated in FIG. 5 in response to an operation of the user. When the user inputs an e-mail address and a password in the login screen, the user terminal 20 transmits a login request including the e-mail address and the password to the information processing apparatus 10.

In step S101, the login request receiving unit 11 receives the login request. Subsequently, the login candidate searching unit 12 searches the user information storage unit 121 for candidates of an entry (hereinafter, referred to as "candidate entries") for which login is to be allowed based on the login request, from among the entries (user information) stored in the user information storage unit 121 (S102).

Figure 6:
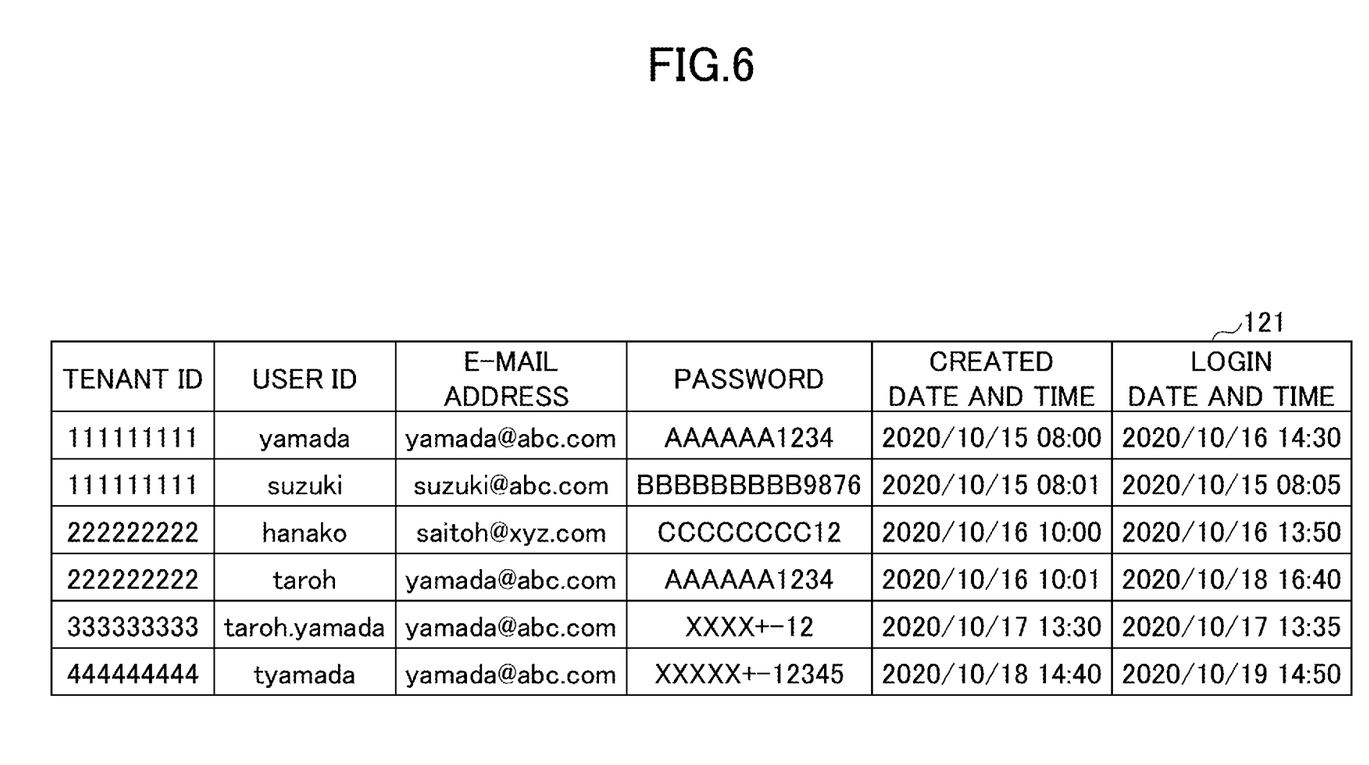
FIG. 6 is a diagram illustrating a configuration example of a user information storage unit according to the first embodiment of the present invention.

FIG. 6 is a diagram illustrating a configuration example of the user information storage unit 121. As illustrated in FIG. 6, the user information storage unit 121 stores an entry including an e-mail address, a password, a created date and time, a login date and time, and the like for each combination of a tenant ID and a user ID.

The tenant ID is identification information of a tenant to which the user belongs. The user ID is identification information for identifying each user by the information processing apparatus 10. Note that the user ID may be unique across all tenants, or may be unique within a tenant. The e-mail address is an e-mail address used as identification information of a user at the time of login. The password is a character string for confirming the validity of the user at the time of login. The created date and time is a date and time when the entry is stored in the user information storage unit 121. That is, the created date and time is the date and time when the e-mail address, the password, and the like are stored in the user information storage unit 121. The login date and time is the date and time at which the user last logged in.

Note that there is a one-to-one association between an e-mail address and a user. That is, in the user information storage unit 121, entries having a common e-mail address correspond to the same user but correspond to different tenants.

For example, FIG. 6 illustrates four entries in which the e-mail address is "yamada@abc.com". These are entries for one user having "yamada@abc.com" as the e-mail address. As described above, in the present embodiment, duplication of the e-mail address between entries is allowed.

Further, duplication of the password between entries having the same e-mail address is also allowed. For example, in the example illustrated in FIG. 6, among the entries having the e-mail address "yamada@abc.com", two entries having the tenant IDs of "11111111" and "222222222" have the same password "AAAAAA1234".

In the first embodiment, an entry in which the e-mail address and the password stored in the user information storage unit 121 match the e-mail address and the password included in the login request, is searched for as a candidate entry.

When there is no candidate entry (NO in S103), the login candidate searching unit 12 transmits a response indicating that login is unsuccessful, to the user terminal 20 (S104). In this case, upon receiving the response, the user terminal 20 redisplays the login screen (FIG. 5).

When there are one or more candidate entries (YES in S103), the login candidate searching unit 12 acquires a list of candidate entries (hereinafter referred to as a "candidate entry list") from the user information storage unit 121 (S105).

Subsequently, the login target selecting unit 13 determines whether there are a plurality of candidate entries included in the candidate entry list (S106). When the number of candidate entries included in the candidate entry list is one (NO in S106), the login target selecting unit 13 selects the candidate entry as an entry related to the login user (S107). The login target selecting unit 13 updates the login date and time of the entry related to the login user to the current date and time in the user information storage unit 121 (FIG. 6).

On the other hand, when there are a plurality of candidate entries included in the candidate entry list (YES in S106), the login target selecting unit 13 generates information (screen data of an entry selection screen) including combinations of tenant IDs and user IDs of the plurality of candidate entries as options, and transmits the screen data to the user terminal 20 that is the transmission source of the login request (S108). The user terminal 20 displays the entry selection screen based on the screen data.

Figure 7:
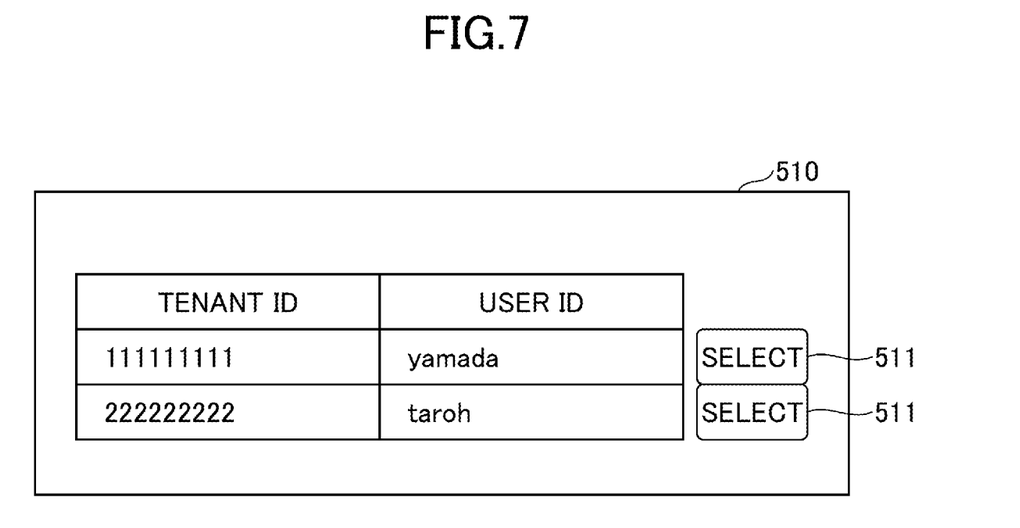
FIG. 7 is a diagram illustrating a display example of an entry selection screen according to the first embodiment of the present invention.

FIG. 7 is a diagram illustrating a display example of an entry selection screen according to the first embodiment. As illustrated in FIG. 7, an entry selection screen 510 includes a tenant ID, a user ID, and a select button 511 for each candidate entry. FIG. 7 is a display example of the entry selection screen 510 when the e-mail address included in the login request is "yamada@abc.com" and the password is "AAAAAA1234". Therefore, the tenant ID and the user ID of two candidate entries corresponding to the e-mail address and the password in the user information storage unit 121 (FIG. 6), are set as options.

When the user selects the select button 511 corresponding to the desired tenant ID and user ID (for example, to be the target of the current login) from the list of tenant IDs and user IDs displayed on the entry selection screen 510, the user terminal 20 transmits the selection result including the tenant ID and the user ID, to the login target selecting unit 13.

In step S109, the login target selecting unit 13 receives the selection result. Subsequently, the login target selecting unit 13 selects the candidate entry related to the tenant ID and the user ID included in the selection result, as the entry related to the login user (S110). The login target selecting unit 13 updates the login date and time of the entry related to the login user to the current date and time in the user information storage unit 121 (FIG. 6).

As described above, according to the first embodiment, it is possible to allow duplication of identification information used for login between different tenants.

Next, a second embodiment will be described. In the second embodiment, points different from the first embodiment will be described. Therefore, points that are not particularly mentioned may be the same as those in the first embodiment.

Figure 8:
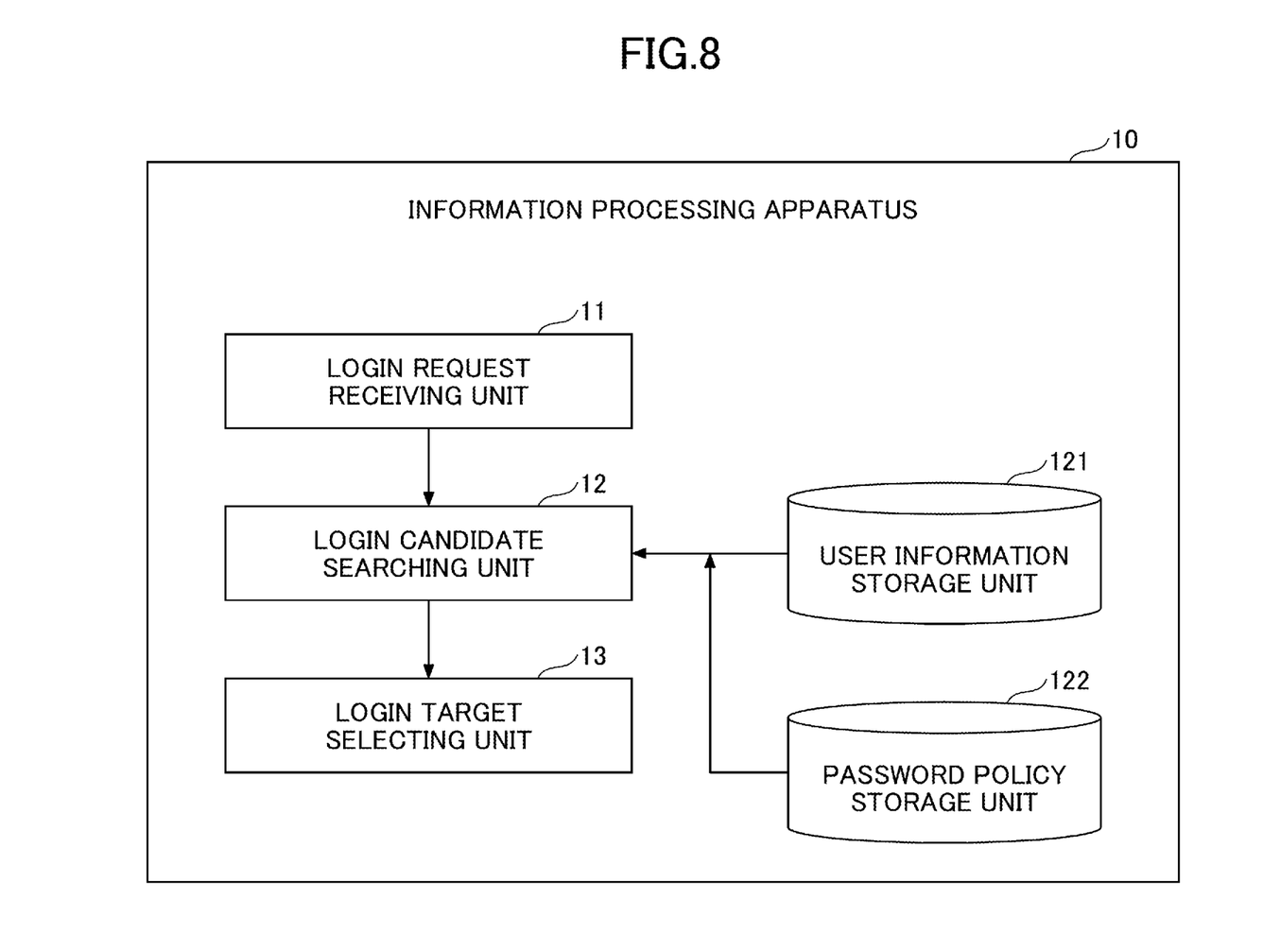
FIG. 8 is a diagram illustrating an example of a functional configuration of the information processing apparatus according to a second embodiment of the present invention.

FIG. 8 is a diagram illustrating a functional configuration example of the information processing apparatus 10 according to the second embodiment. In FIG. 8, the same elements as those in FIG. 3 are denoted by the same reference numerals, and a description thereof will be omitted.

As illustrated in FIG. 8, in the second embodiment, the information processing apparatus 10 further uses a password policy storage unit 122. The password policy storage unit 122 can be implemented by using, for example, the auxiliary storage device 102 or a storage device connectable to the information processing apparatus 10 via a network.

The password policy storage unit 122 stores, for each tenant, a password policy defined in the tenant. The password policy is information indicating a restriction condition regarding the configuration of a password. More specifically, a password policy refers to information indicating conditions regarding the number of characters, the combination of characters, and the like that can be used for a password.

Figure 9:
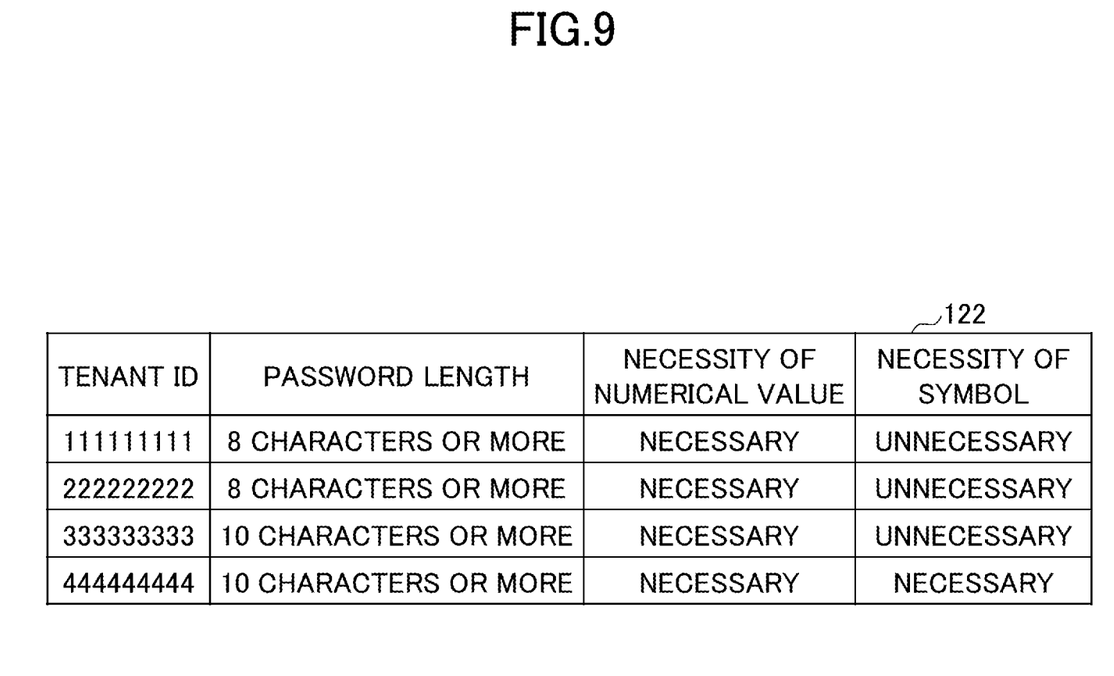
FIG. 9 is a diagram illustrating a configuration example of a password policy storage unit according to the second embodiment of the present invention.

FIG. 9 is a diagram illustrating a configuration example of the password policy storage unit 122. As illustrated in FIG. 9, the password policy storage unit 122 stores a password policy defined in a tenant related to a tenant ID, in association with the tenant ID. FIG. 9 illustrates an example in which the password length, the necessity of a numerical value, and the necessity of a symbol are the elements of the password policy. The password length is a specification regarding the number of characters of the password. The necessity of a numerical value is the necessity of including one or more numerical values in the password. The necessity of a symbol is the necessity of including one or more symbols in the password. The password policy illustrated in FIG. 9 is merely an example. A password policy configured by other elements may also be used.

In the second embodiment, the basic processing procedure executed by the information processing apparatus 10 is the same as the processing procedure illustrated in FIG. 4. However, in the second embodiment, the definition of the candidate entry searched in step S102 in FIG. 4 is different from that in the first embodiment. To be specific, in step S102, the login candidate searching unit 12 searches for, as a candidate entry, an entry in which the password policy of the tenant related to the entry matches the password included in the login request, among entries in which the e-mail address stored in the user information storage unit 121 corresponds to the e-mail address included in the login request.

Figure 10:
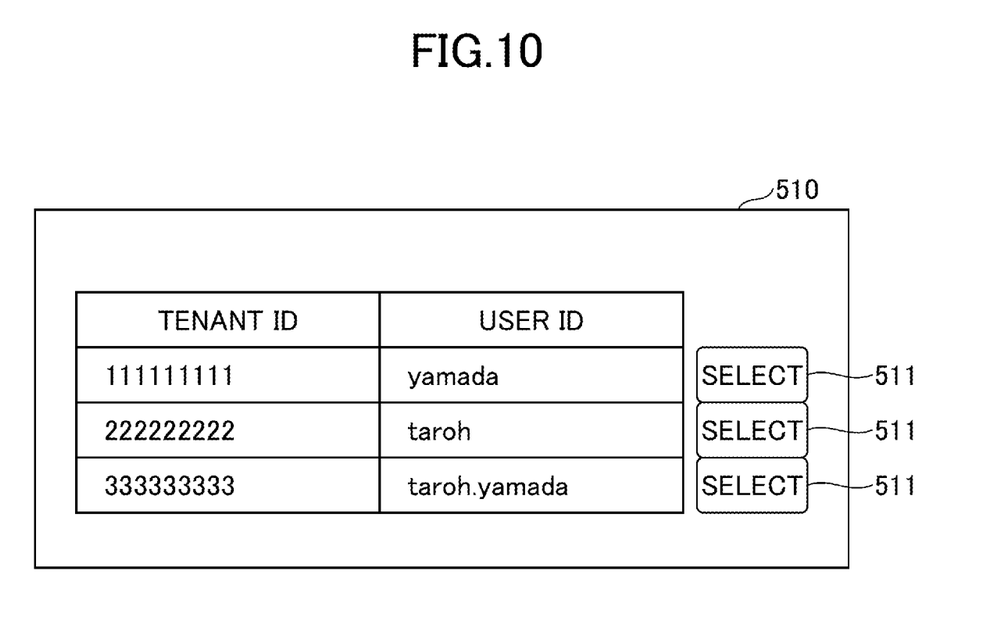
FIG. 10 is a diagram illustrating a display example of an entry selection screen according to the second embodiment of the present invention.

In this case, in step S108, the login target selecting unit 13 generates screen data of the entry selection screen 510 as illustrated in FIG. 10. FIG. 10 is a display example of the entry selection screen 510 when the e-mail address included in the login request is "yamada@abc.com" and the password is "AAAAAA1234". In the user information storage unit 121 (FIG. 6), there are four entries including this e-mail address. Among the password policies (FIG. 9) of the tenants related to the respective tenant IDs of these four entries, the password policies matching "AAAAAA1234" (satisfied by "AAAAAA1234") are the password policies of the tenants related to the tenant IDs "11111111", "222222222", and "333333333". Therefore, the three entries related to these three tenants correspond to candidate entries. Therefore, the entry selection screen 510 of FIG. 10 includes the tenant ID, the user ID, and the like of each of these candidate entries.

As described above, according to the second embodiment, the same effects as those of the first embodiment can be obtained. Further, not only an entry including a password completely matching the input password, but also an entry whose password policy matches the input password can be set as a candidate entry. Therefore, for example, by setting a password for one tenant, it is possible to log in to any one of a plurality of tenants within a range of tenants corresponding to the password policy that matches an input password.

Next, a third embodiment will be described. In the third embodiment, points different from the first embodiment will be described. Therefore, points that are not particularly mentioned may be the same as those in the first embodiment.

In the third embodiment, the definition of the candidate entry searched in step S102 in FIG. 4 is different from that in the first embodiment. To be specific, in step S102, the login candidate searching unit 12 searches for, as a candidate entry, an entry in which the e-mail address stored in the user information storage unit 121 matches the e-mail address included in the login request. That is, among the entries registered in the user information storage unit 121, an entry whose e-mail address matches that in the login request is retrieved as a candidate entry, even if the password is different from that in the login request.

Figure 11:
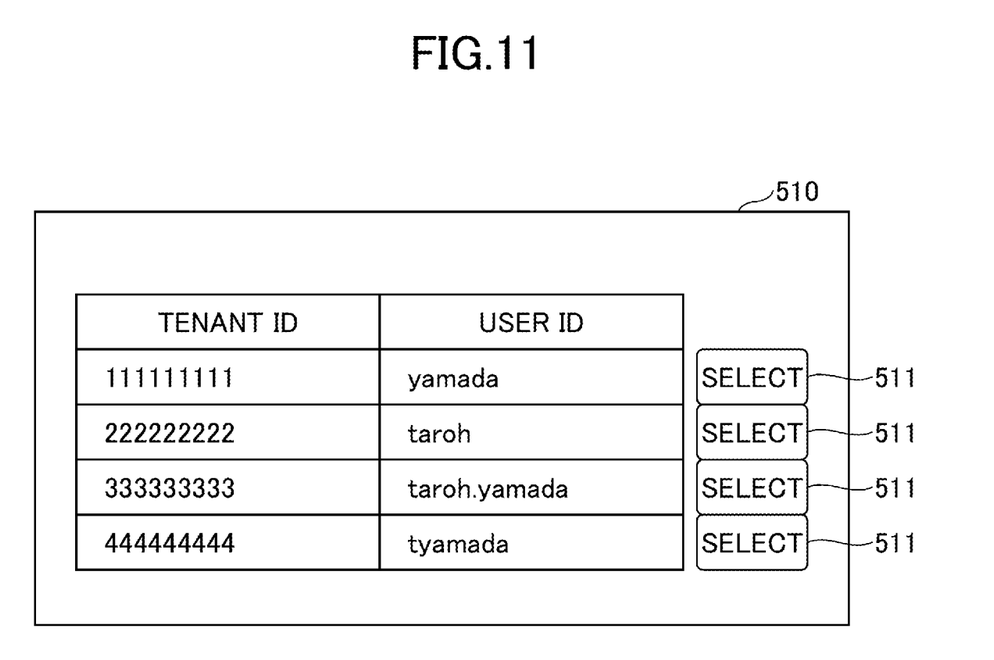
FIG. 11 is a diagram illustrating a display example of an entry selection screen according to a third embodiment of the present invention.

In this case, in step S108, the login target selecting unit 13 transmits screen data of the entry selection screen 510 as illustrated in FIG. 11 to the user terminal 20. FIG. 11 is a display example of the entry selection screen 510 when the e-mail address included in the login request is "yamada@abc.com". Therefore, the tenant IDs and the user IDs of the four candidate entries corresponding to this e-mail address in the user information storage unit 121 (FIG. 6), are set as options.

As described above, according to the third embodiment, the same effects as those of the first embodiment can be obtained. Further, if the password matches a password set in any of entries registered for different tenants and having matching identification information (e-mail address), it is possible to allow log in as the user of the corresponding entry.

Next, a fourth embodiment will be described. In the fourth embodiment, points different from the first to third embodiments will be described. Therefore, points that are not particularly mentioned may be the same as those in any one of the first to third embodiments.

Figure 12:
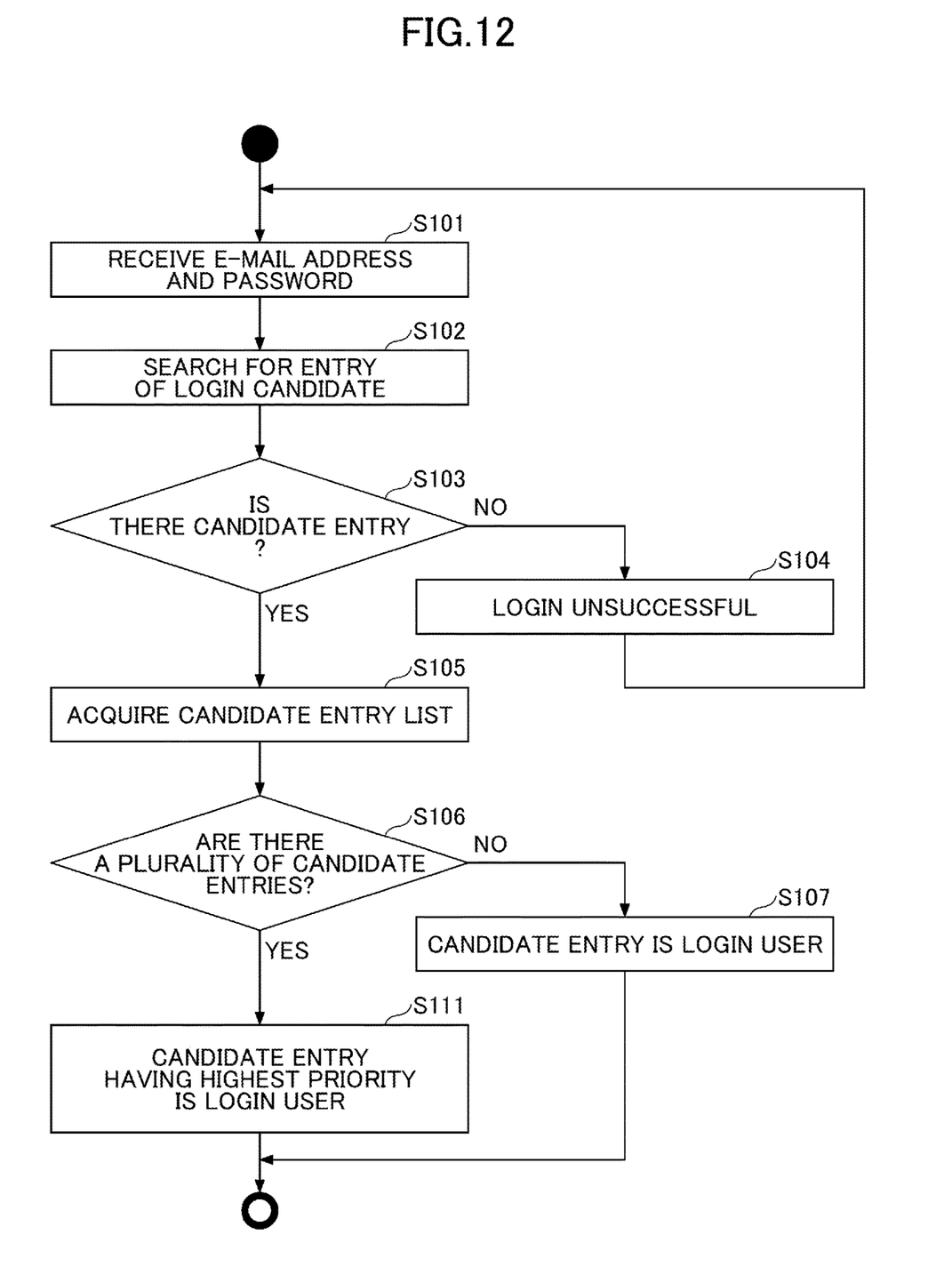
FIG. 12 is a diagram for explaining an example of a processing procedure executed by the information processing apparatus according to a fourth embodiment of the present invention.

FIG. 12 is a diagram for explaining an example of a processing procedure executed by the information processing apparatus 10 in the fourth embodiment. In the fourth embodiment, the information processing apparatus 10 executes the processing procedure of FIG. 12 instead of the processing procedure of FIG. 4. In FIG. 12, the same steps as those in FIG. 4 are denoted by the same step numbers, and descriptions thereof will be omitted.

In FIG. 12, steps S108 to S110 in FIG. 4 are replaced with step S111. In step S111, the login target selecting unit 13 selects a candidate entry having the highest priority among the plurality of candidate entries, as an entry related to the login user. The login target selecting unit 13 updates the login date and time of the entry related to the login user to the current date and time in the user information storage unit 121 (FIG. 6).

Here, the priority of each candidate entry may be identified based on the order in which each candidate entry is stored (registered) in the user information storage unit 121. For example, the earlier the created date and time is, the higher the 2C priority may be. In this case, the login target selecting unit 13 selects a candidate entry having the earliest created date and time among the plurality of candidate entries. Alternatively, the later the created date and time is, the higher the priority may be. In this case, the login target selecting unit 13 selects a candidate entry having the latest created date and time among the plurality of candidate entries.

Alternatively, the later the login date and time is, the higher the priority may be. In this case, the login target selecting unit 13 selects a candidate entry having the last login date and time (the last selected candidate entry) among the plurality of candidate entries.

As described above, according to the fourth embodiment, the same effects as those of the first to third embodiments can be obtained.

Further, in a case where an entry whose created date and time is earlier is set to have a higher priority, for example, even in a case where entries having overlapping identification information (e-mail address) are inadvertently created for a plurality of tenants, the user can log in as the user of a tenant that the user has been using in the past.

Further, in a case where an entry whose created date and time is later is set to have a higher priority, for example, it is possible to quickly log in by the newly created entry.

Further, in a case where the priority of an entry whose login date and time is later is set to have a higher priority, for example, it is possible to facilitate login by an entry for which the usage frequency by the user is the highest.

Note that the information processing apparatus 10 or the user terminal 20 is not limited to a general-purpose computer such as a PC, as long as the apparatus has a communication function. The information processing apparatus 10 may be, for example, an image forming apparatus, a projector (PJ), an interactive white board (IWB), an output apparatus such as a digital signage, a head up display (HUD) apparatus, an industrial machine, an imaging apparatus, a sound collecting apparatus, a medical device, a network home appliance, a notebook personal computer (PC), a mobile phone, a smartphone, a tablet terminal, a game machine, a personal digital assistant (PDA), a digital camera, a wearable PC, a desktop PC, or the like.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC), a digital signal processor (DSP), a field programmable gate array (FPGA), and a conventional circuit module, designed to execute each function as described above.

In the present embodiment, the login candidate searching unit 12 is an example of a searching unit. The login target selecting unit 13 is an example of a selecting unit.

According to one embodiment of the present invention, duplication of identification information used for login may be allowed.

The information processing apparatus, the information processing method, and the recording medium are not limited to the specific embodiments described in the detailed description, and variations and modifications may be made without departing from the spirit and scope of the present invention.

What is claimed is:

1. An information processing apparatus comprising:
   circuitry; and
   a memory storing computer-executable instructions that cause the circuitry to execute:
   searching for user information corresponding to identification information included in a login request, in a storage configured to store user information of each user, in response to receiving the login request including the identification information; and
   selecting, as user information relating to a user for which login is to be allowed, one piece of user information among a plurality of pieces of user information, in response to detecting that the plurality of pieces of user information are retrieved by the searching,
   wherein the user information includes the identification information and a date and time when the identification information was stored in the storage, and
   wherein the selecting is based on the date and time.

2. The information processing apparatus according to claim 1, wherein the selecting includes
   transmitting, to a terminal that is a transmission source of the login request, information in which the plurality of pieces of user information are options, and
   selecting, as the user information relating to the user for which the login is to be allowed, user information that is selected from among the plurality of pieces of user information at the terminal.

3. The information processing apparatus according to claim 1, wherein the selecting includes selecting the one piece of user information from among the plurality of pieces of user information, based on an order in which the identification information has been stored in the storage.

4. The information processing apparatus according to claim 1, wherein the selecting includes selecting user information that is selected last from among the plurality of pieces of user information.

5. The information processing apparatus according to claim 1, wherein the circuitry is further configured to execute searching for the user information in response to receiving the login request including the identification information and a password.

6. The information processing apparatus according to claim 5, wherein the circuitry is further configured to execute searching the storage for the user information corresponding to the identification information and the password included in the login request.

7. The information processing apparatus according to claim 5, wherein the circuitry is further configured to execute searching for the user information whose password policy matches the password included in the login request, from among the plurality of pieces of user information corresponding to the identification information included in the login request.

8. The information processing apparatus according to claim 1, wherein the circuitry is further configured to execute selecting the one piece of user information having the earliest stored date and time among the plurality of pieces of user information.

9. An information processing method executed by a computer, the information processing method comprising:
   searching for user information corresponding to identification information included in a login request, in a storage configured to store user information of each user, in response to receiving the login request including the identification information; and
   selecting, as user information relating to a user for which login is to be allowed, one piece of user information among a plurality of pieces of user information, in response to detecting that the plurality of pieces of user information are retrieved by the searching,
   wherein the user information includes the identification information and a date and time when the identification information was stored in the storage, and
   wherein the selecting is based on the date and time.

10. A non-transitory computer-readable recording medium storing a program that causes a computer to execute a process, the process comprising:
    searching for user information corresponding to identification information included in a login request, in a storage configured to store user information of each user, in response to receiving the login request including the identification information; and
    selecting, as user information relating to a user for which login is to be allowed, one piece of user information among a plurality of pieces of user information, in response to detecting that the plurality of pieces of user information are retrieved by the searching,
    wherein the user information includes the identification information and a date and time when the identification information was stored in the storage, and
    wherein the selecting is based on the date and time.

* * * * *